(12) United States Patent
Alameh et al.

(10) Patent No.: US 10,554,658 B2
(45) Date of Patent: Feb. 4, 2020

(54) BOOTSTRAPPING AND ADAPTIVE INTERFACE

(71) Applicant: Motorola Mobility LLC, Chicago, IL (US)

(72) Inventors: Rachid Alameh, Chicago, IL (US); Jarrett Simerson, Chicago, IL (US); Zhengping Ji, Chicago, IL (US); Michael Corrigan, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 208 days.

(21) Appl. No.: 15/858,226

(22) Filed: Dec. 29, 2017

(65) Prior Publication Data

US 2019/0207931 A1     Jul. 4, 2019

(51) Int. Cl.
*H04L 9/00*     (2006.01)
*H04L 29/06*    (2006.01)
*H04W 12/06*    (2009.01)
*H04W 12/00*    (2009.01)
*H04W 12/08*    (2009.01)

(52) U.S. Cl.
CPC ...... *H04L 63/0861* (2013.01); *H04L 63/0853* (2013.01); *H04L 63/104* (2013.01); *H04W 12/0027* (2019.01); *H04W 12/00503* (2019.01); *H04W 12/06* (2013.01); *H04W 12/08* (2013.01)

(58) Field of Classification Search
CPC . H04L 63/0853; H04L 63/0861; H04W 12/06
See application file for complete search history.

(56) References Cited

U.S. PATENT DOCUMENTS

| 2016/0345176 | A1* | 11/2016 | DeWitt | G06Q 30/0261 |
| 2017/0185103 | A1* | 6/2017 | Kim | H04B 1/38 |
| 2018/0048630 | A1* | 2/2018 | Griffin | G06F 21/31 |
| 2018/0098184 | A1* | 4/2018 | Tsuji | H04W 4/80 |
| 2018/0109984 | A1* | 4/2018 | Wu | H04W 36/32 |
| 2018/0262501 | A1* | 9/2018 | Sugahara | G08G 5/0013 |
| 2018/0351925 | A1* | 12/2018 | Badri | H04L 63/06 |
| 2019/0042774 | A1* | 2/2019 | Claiborne | H04W 4/80 |

* cited by examiner

*Primary Examiner* — Beemnet W Dada
(74) *Attorney, Agent, or Firm* — McKinney Phillips LLC; Phillip Pippenger

(57) ABSTRACT

Systems and methods for authenticating a user of a mobile communications device entail scanning an environment of the mobile device with a low power sensor and detecting a nearby person via the first sensor. In response, a higher power sensor is activated and the person is authenticated via the second sensor using a first authentication mechanism. A first level of access is granted to the person at this point. When the person moves to within a first threshold distance of the device, the person is authenticated using a second more secure authentication mechanism, and a second, higher, level of access is granted to the person.

19 Claims, 4 Drawing Sheets

BOOTSTRAPPING AND ADAPTIVE INTERFACE

TECHNICAL FIELD

The present disclosure is related generally to mobile electronic communications devices and, more particularly, to systems and methods for increasing the ease of use of a mobile electronic communications device.

BACKGROUND

With the ever-increasing role played by mobile devices such as full function cellular phones and other mobile communications devices, the need for simple yet secure access becomes more pressing. While highly accurate authentication is possible, such authentication tends to require higher power sensors and systems such as high resolution or high frame rate depth imaging, and high resolution camera imaging.

Before proceeding to the remainder of this disclosure, it should be appreciated that the disclosure may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, device security has become increasingly important as the amount of data stored on user's devices has increased. However, while device security is important, it is also important to the user experience to provide a more seamless interaction with the device with respect to security.

This is accomplished without excessive power drain or security concerns in an embodiment of the described principles via a device that bootstraps from low power sensors to fuller capabilities as the distance between the user and the device changes. This enables the device to recognize people (e.g., by ID and Location), be it the user or otherwise, and responsively adapt the user interface. In this way, the device provides a convenient user experience with a seamless and adaptive device interface and touchless authentication based on user location, distance, context, and identity. The benefits are twofold: power saving by knowing if/when to turn on certain sensors/functionality and smart adaptive device interface by engaging at the right time with the right functionality.

To maintain low power for device during authentication or interface modes, sound, thermal, light, shadow, and non-cellular (e.g., Bluetooth or WiFi) sensors are monitored for changes and are assessed to determine presence. These presence sensors are very low power and can be used as sensors 24 hours per day. Any of these sensors may in turn trigger depth sensor imaging to map the room and locate the person or persons that are present. As the user draws closer, the depth sensor output triggers the device camera to awake for facial authentication. For certain other non-authentication operations, or following authentication operation, the depth sensor array may trigger functionality other than the camera such as turning the display on or adjusting alert content and level based on user distance, location around device and motion profile.

In an embodiment, when the device is authenticating, it employs voice first, access context/location, then Imager/Depth profiling. Limited access is granted until the imager confirms the user, after which time full access is granted. Access may be moderated based on other personnel who may be present at the device location.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
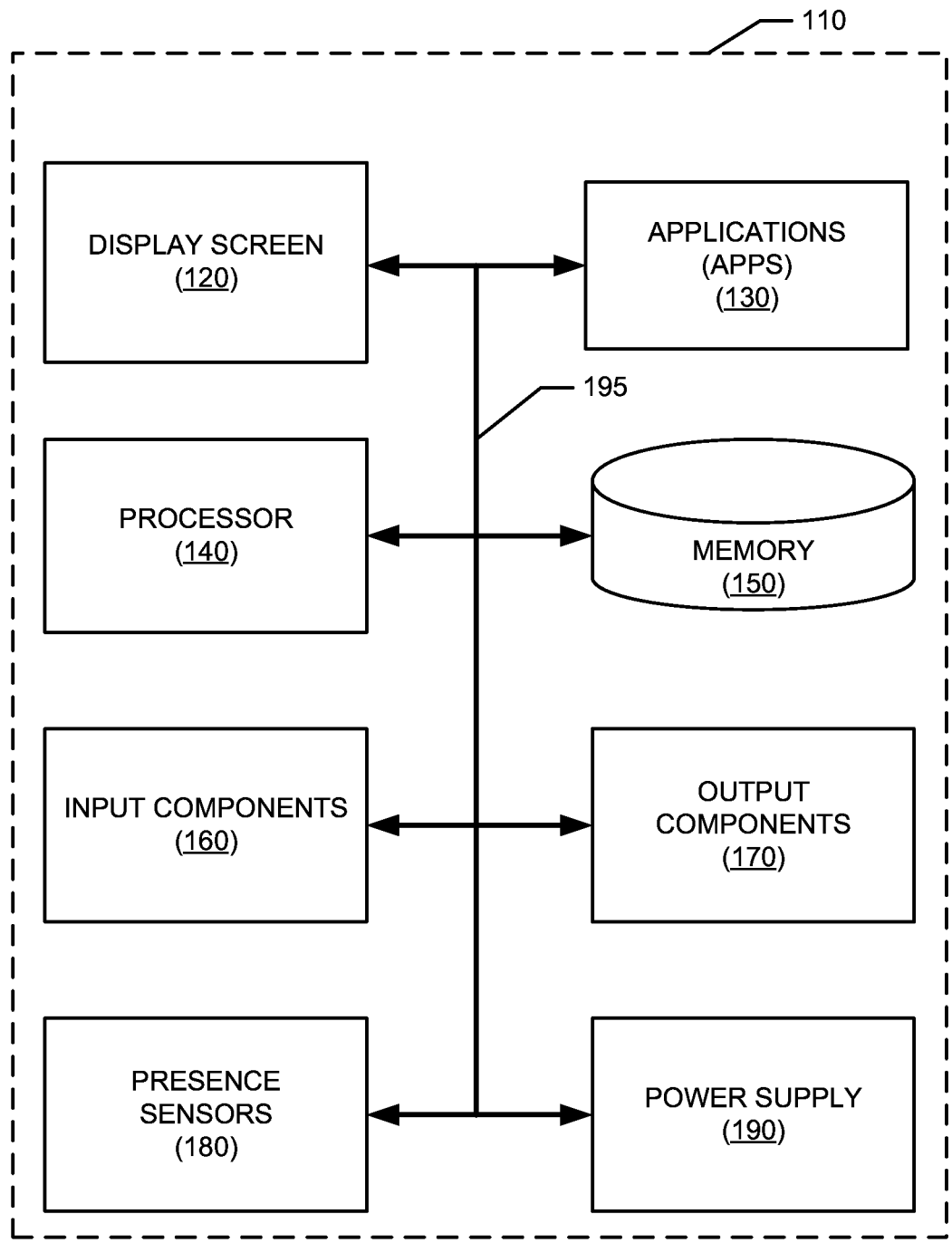
FIG. 1 is a general schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be any of a microprocessor, microcomputer, application-specific integrated circuit, and the like. For example, the processor 140 can be implemented by one or more microprocessors or controllers from any desired family or manufacturer. Similarly, the memory 150 is a nontransitory media that may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to presence detection and authentication.

One or more sensors 180 provide presence detection capabilities, and these sensors may include a barometric sensor, an audio sensor, a thermal sensor, a light switching/flicker sensor, a light change sensor, a Bluetooth system or interface thereto, an accelerometer or gyroscope ("gyro"), a proximity/range sensor, a vibration sensor, etc.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

Figure 2:
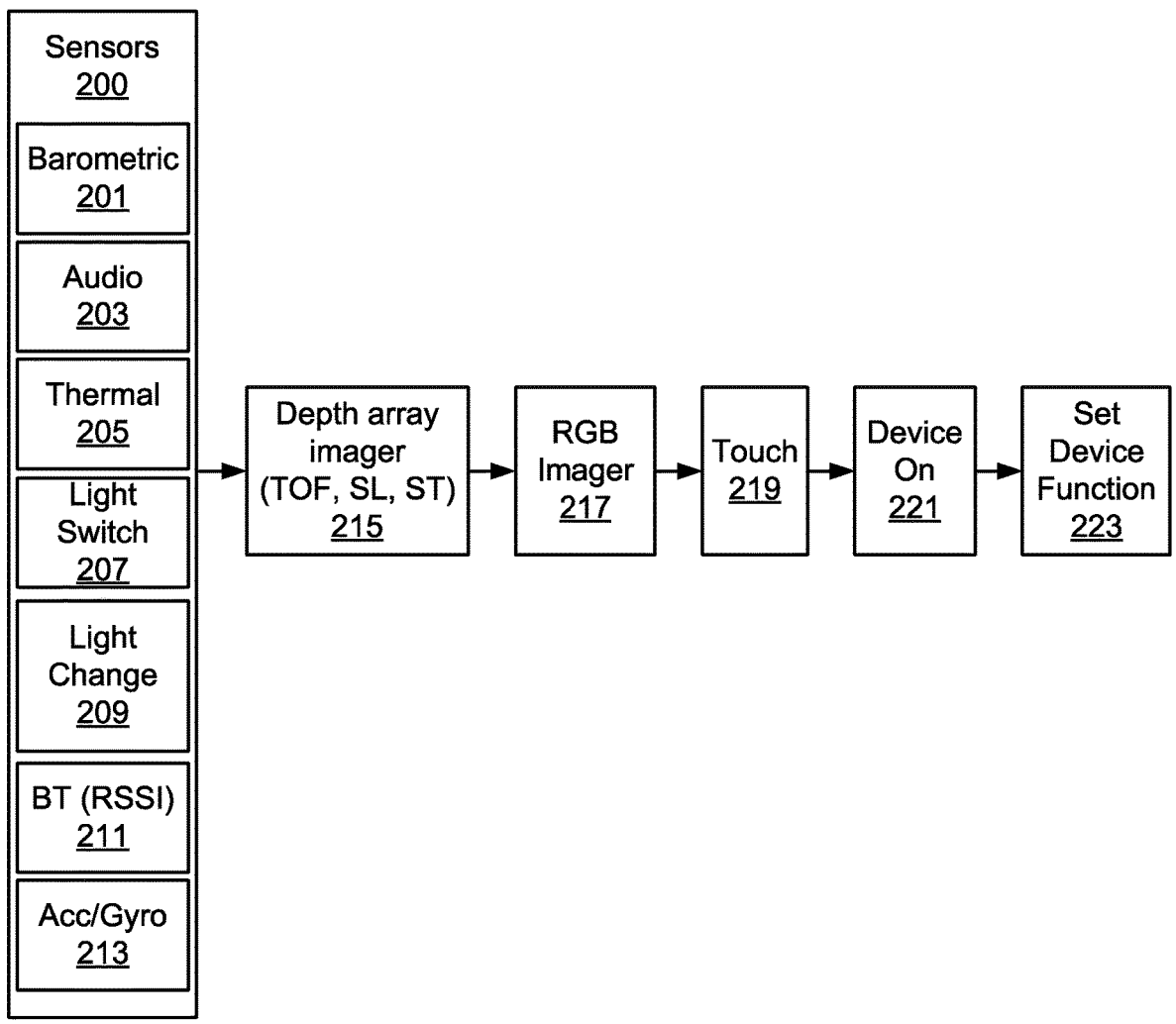
FIG. 2 is a logical view showing the sensor hierarchy in an embodiment of the described system.

FIG. 2 is a logical view showing the sensor hierarchy in an embodiment of the described system. As can be seen, the device includes numerous sensors or systems 200 able to perform a sensor function. These include a barometric sensor 201, an audio sensor 203, thermal sensor 205, light switching sensor 207, light change sensor 209, Bluetooth system 211 and an accelerometer or gyro 213.

These sensors 200 are able to remain powered on in a low power mode while the device is not in use. When one of the sensors 200 is triggered, e.g., when a person walks into a room wherein the device is located and causes a shadow or makes a noise, the device proceeds to the next set of sensors and systems, with the next being the depth array imager 215. The depth array imager 215 may be a time-of-flight, structured light, or ST system.

Depending upon the outcome of the depth array imager, the device may then activate a camera, such as RGB imager 217 or touch sensor 219 for authentication. Upon authentication, the device is powered on or awakened (221) and sets its functional mode as appropriate (223) based on the device context identified by the layered sensors. An example of this operation is shown in FIG. 3.

By way of example, consider a mobile electronic communications device, such as a cellular phone, lying on a table. In this case, the device accelerometer shows that the device is horizontal and stationary. Now when the device sensors detect a change in the environment (e.g., via sensing a voice, light change, RF signature or otherwise), the device scans the room with the depth sensor and locates the user. After pinpointing the user location relative to the device, the device conducts further operations as appropriate.

If the distance to the user is short (e.g., less than or equal to 5 feet), then the device conduct Imager/depth recognition/profiling for authentication (both RGB and IR). If the distance to the user is far distance (e.g., greater than 5 feet) then the device assists the imager and audio system to steer or focus the audio sensors toward the person's location and set the visible camera (RGB) focus based on depth distance. At this point, the device is able to set its functional mode and adapt the user interface. For example, the interface when the user is alone will be different than the interface when others are present, and may depend upon whether the context suggests a private or public setting.

Figure 3:
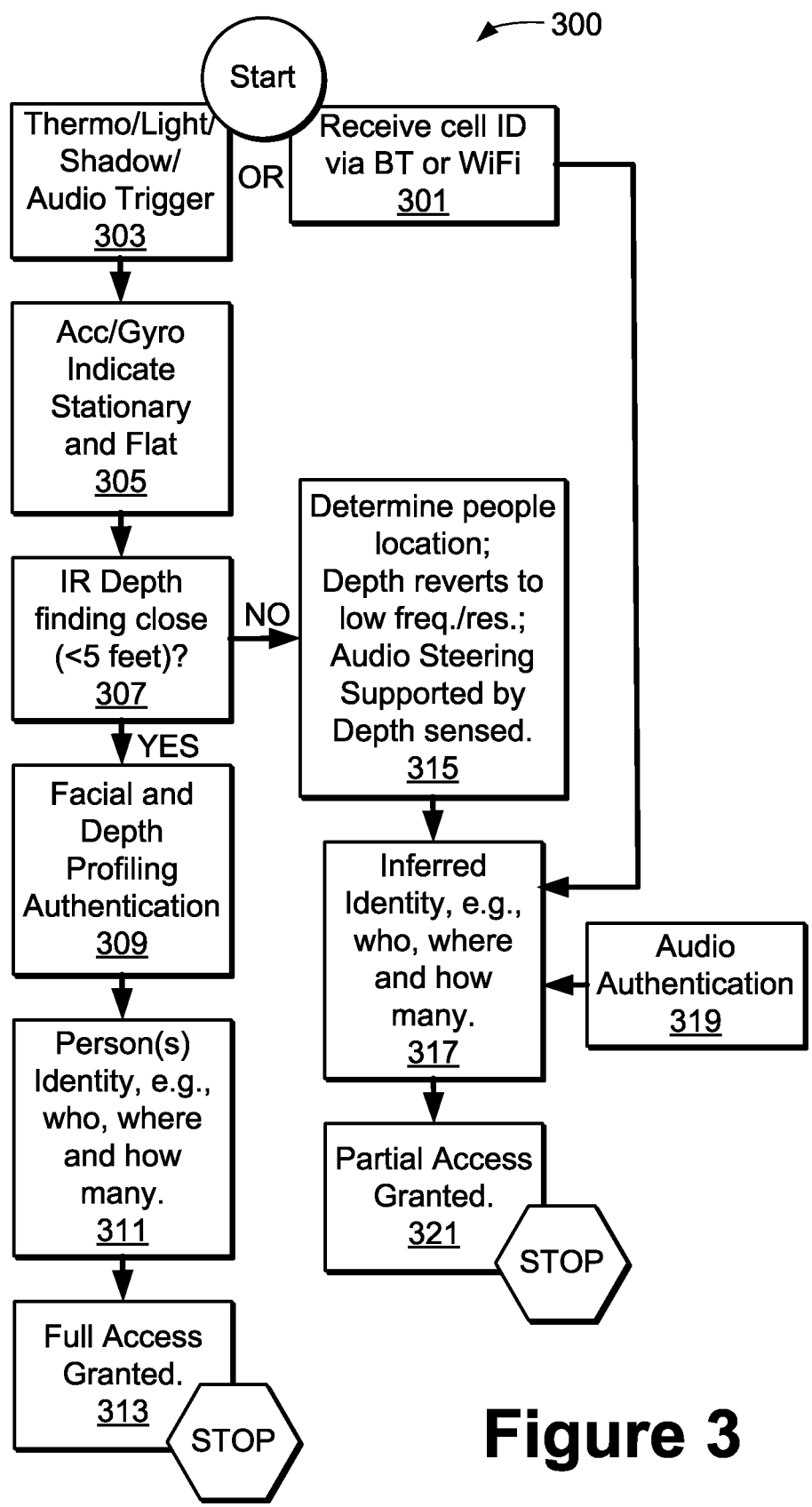
FIG. 3 is a flow chart showing a process in accordance with an example of the described principles.

FIG. 3 is a flow chart showing a process in accordance with an example of the described principles executed by the foregoing architecture. The operation may begin at stage 301 or 303, depending upon which is triggered first. Stage 301 is triggered if the device Bluetooth or WiFi system senses a new device presence, while stage 302 is triggered if any of the first level sensors is triggered (thermal sensor, light sensor, etc.).

If stage 301 is triggered first, e.g., the device Bluetooth or WiFi system senses a new device presence, then the process 300 moves to stage 317, wherein an ID is inferred for each presence detected. In this case, the ID may be known from past contact, in which case it may be looked up by device.

It will be appreciated that other mechanisms may instead be used to resolve a wireless ID to a device or person ID, and in an embodiment, audio confirmation of the inferred ID may be made as shown in stage 319 leading into stage 317. Because the ID made by the device is largely inferred, the device at stage 321 grants [partial but not full access to the device. This may mean, for example, that message notifications still appear, but contain no other information, or only a name but no preview. Further, at far distance from device, the depth array and imager sensor can ID the user to supplement voice (but not authenticate, e.g., the person may resemble the right person with respect to size, features, shape, age, etc.), and grant partial device access.

If instead stage 303 has been triggered first, then the process 300 flows to stage 305 to check, e.g., via the device accelerometer or gyro, that the device is lying flat and stationary. If so, the process 300 executes IR depth finding at stage 307 to determine if the detected person is close (e.g., 5 feet or closer to the device) or far (e.g., further than 5 feet from the device). In the event that the person is found to be far from the device, the process 300 moves to stage 315, wherein the depth finding reverts to low frequency or low resolution (since the user is too far to authenticate and can still help with identification as described above, especially if the user is not talking) and the device uses steered audio aided by the depth findings to further analyze the people and objects in the vicinity of the device. Following this adjustment, the device continues at stage 317 et. seq. to infer identities, resulting in a grant of at most partial access at stage 321. It is understood that in order for the camera or depth array to monitor the user while the device is on a table, the camera and depth array should have broad coverage such as 180-degrees. Such broad coverage devices are readily available and generally employ a type of fish eye lensing or other design.

However, if it was determined at stage 307 that the user is indeed close to the device, then the process 300 flows to stage 309, wherein the device employs facial and depth profiling for authentication (since the user is close enough to be visually identified). The precise identity(s) and location(s) of nearby ("close") people are resolved at stage 311, and, if warranted by the determined identity(s), full access is granted at stage 313.

With respect to the precise level of access granted, the device may implement different rules as desired by the device or application manufacturer. However, in an embodiment, the device context is linked to access states as follows. If it is determined that only the authorized device user is close to the device, then the device may read messages aloud, turn on the device screen with the device unlocked if the user gets even closer, and adjust audio and ringer volume based on user distance, e.g., softer at closer distance and louder at greater distance.

If instead it is determined that other people are near the device with the authorized user, then the device locks or remains locked, announces the existence of received messages with no further detail, and darkens the screen. Alternatively, if no person near the phone is the authorized user, the device locks, with the screen off, and only gives a slight chirp or flash to indicate incoming messages.

If the personnel near the device include the authorized user and his or her family members, then the device announces messages by sender but not content and may remain unlocked. If the device detects that there is nobody near the device, then alerts become silent but the ringer volume is raised (due to the likely distance to the authorized user), and the device replies to callers based on their caller ID. For example, if the caller is a family member, then the device informs the caller of the last time that the user was near the device. Alternatively, if the caller is not a family member, then the device simply informs the caller of the device user is not available. There are different levels of security the device considers, including: device owner or authorized user, device owner plus others that are family/familiar, owner plus others that are strangers, not owner/only stranger/s, and no one/absence.

Figure 4:
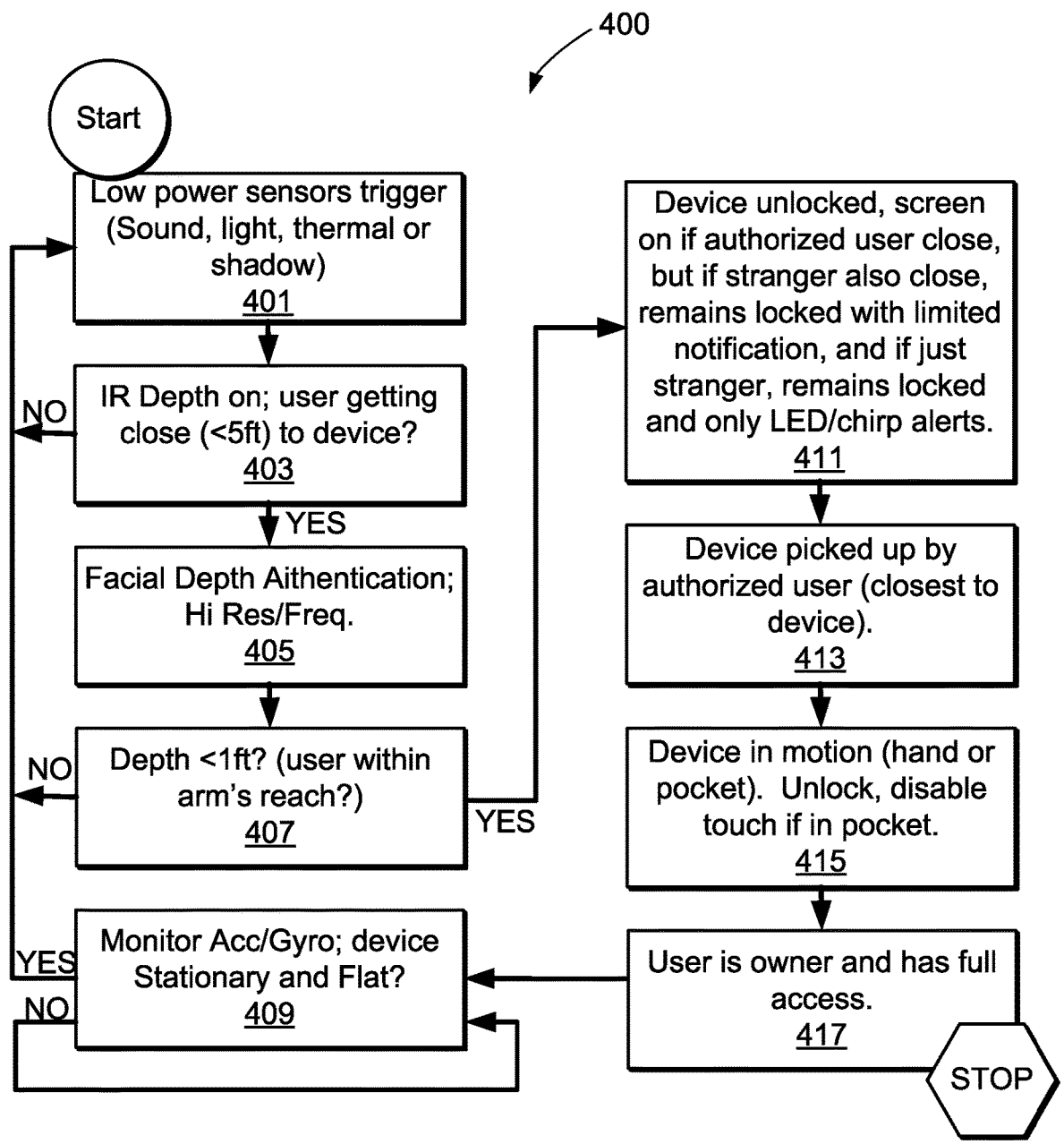
FIG. 4 is a flow chart showing a process in accordance with a further example of the described principles.

The flow chart of FIG. 4 shows a more general process in accordance with an embodiment of the disclosed principles. In particular, the process 400 employs the bootstrapping through a sensor hierarchy and also addresses situations potentially involving device movement.

At stage 401 of the illustrated process 400, the low power sensors are triggered, e.g., by sound, light, a thermal presence or shadow. The IR Depth imaging is activated at stage 403 to determine if the user is getting close to (e.g., within 5 feet of) the device. If the user is not getting close to the device, then the process 400 returns to stage 401 to monitor the low power sensors. Otherwise, the process continues on to stage 405, wherein high resolution or high frequency depth scanning is enabled to allow facial authentication.

The process moves from stage 405 to stage 407, wherein it is determined via depth sensing whether the user is within arm's reach, e.g., within 1ft of the device. If the user is not within arms reach of the device, the process 400 returns to stage 401 to monitor the low power sensors. Otherwise, the process continues on to stage 411, wherein the device is unlocked and the screen turned on if authorized user close. If a stranger is also close however, the device remains locked with limited notifications. If just stranger is close, the device remains locked and provides only LED/chirp alerts.

At stage 413, the device is picked up by the user, as detected by motion and contact sensors, and at stage 415, the device is in motion, whether in the user's hand or pocket, and the device becomes or remains unlocked. The device touch screen may be disabled if the device is in the user's pocket to prevent false dialing.

At this point, as represented in stage 417, the user is the owner and is provided full access to the device, and the process flows to stage 409 to monitor the device movement and orientation, e.g., via the accelerometer and gyro. If the device is detected to become stationary and flat, as if laying on a horizontal surface, the process 400 then locks the phone and returns to stage 401 to monitor the low power sensors.

The parameters of the user's access can vary, but in an embodiment, the device is unlocked, the screen is initially on, the device defaults to displaying messages on screen (with the option to read aloud), the device sets the volume for the ringer and any alerts to low, and the device causes the depth imager to perform facial profiling for image authentication periodically or upon the occurrence of a significant change in the device environment (e.g., new person present, large increase in ambient noise, substantial decrease in ambient light, and so on).

Thus, considering a further example, wherein the device is sitting on a table, and someone approaches very close (e.g., within one foot) and picks up device. At this point, the first level of sensors (e.g., audio/thermal/light/shadow) have already been triggered and depth imaging has been enabled. The depth imaging locates people in the room with low resolution, and then where able, tries to authenticate people with camera imaging in close high resolution. Unknown persons are marked by the device as unknown.

The depth imager, cameras and audio sensors track the authenticated user and determine when the authorized user is approaching the device and is within arm's reach of the device. Display and touch are enabled and device is unlocked when only the authorized user is near. Once the device experience motion (e.g., it is touched or picked up), the device turns fully on.

If a stranger had approached the device with the authorized user, then the device remains locked but can alert of incoming messages and transcribe or summarize the title without providing any further details. If a stranger approaches the device alone, the device remains locked and alerts are given via a light (e.g., LED) indication or audible chirp, but no further audio information or textual information is provided.

As can be seen from these examples, the described principles allow low power touchless authentication that starts to authenticate with low power sensors when an individual is still far from device (granting partial access if authorized) and switches to visual authentication when depth sensing indicates that the person has come close. At this point, full access is granted if authentication is successful.

The depth sensing resolution and frame rate are driven by user distance in an embodiment, such that when a person is far away (e.g., great than 5 feet from the device), depth sensing resolves the person's location, and when the person is closer, the depth sensing switches to higher resolution or frame rate to conducts facial profile authentication.

The depth sensor also affects the display content and qualities, in that the device display is turned on when depth sensing indicates very close proximity between an authorized user and the device, but the displayed content with respect to received messages, is lessened when depth sensing further indicates the presence of an unauthorized user. Similarly, the device speaker communicates message details when depth sensing indicates close proximity between an authorized user and device, but limits details in the presence of an unauthorized user.

In an embodiment, the device enables a touch sensor for access to the device only when the user is already touchlessly authenticated (e.g., upon visual-full authentication), and enables display viewing access for partial or full authentication depending upon distance. Similarly, the device may authenticate a user with voice authentication first then the imager, granting limited access until the imager confirms the authentication for full access.

More generally, the device may authenticate a user with voice at far distances (e.g., outside of 5 feet), then via imaging when the distance becomes closer (e.g., 5 feet or less) and device ID (WiFi or Bluetooth), and combine these with depth profiling of the environment to grant a level of access to the device based on identity, private or public setting (e.g., one or many, stranger or family) and device separation.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile communications device providing sensor bootstrapping and an adaptive interface, the device comprising:

a first sensor group having one or more first sensors;
a second sensor group having one or more second sensors, wherein the one or more first sensors operate at a lower power level than the one or more second sensors; and
a processor configured to detect a person with the first sensor group while the second sensor group is idle, and in response, to activate one or more of the second sensors to authenticate the person with a first level of accuracy and locate the person relative to the mobile communications device, and to detect that the distance between the mobile communications device and the person has become less than a first threshold distance, and in response, to activate an additional one of the second sensors to authenticate the person with a second level of accuracy, wherein the second level of accuracy is greater than the first level of accuracy.

2. The mobile communications device in accordance with claim 1, wherein the first sensor group includes one or more of a barometric sensor, an audio sensor, a thermal sensor, a light switching sensor, a light change sensor, vibration sensor, proximity sensor, and RF/BT/WiFi (radio frequency/Bluetooth/WiFi) sensor.

3. The mobile communications device in accordance with claim 1, wherein the second sensor group includes a non-cellular wireless transceiver.

4. The mobile communications device in accordance with claim 3, wherein the non-cellular wireless transceiver includes at least one of a Bluetooth transceiver and a WiFi transceiver.

5. The mobile communications device in accordance with claim 1, wherein the second sensor group includes a depth imager and camera.

6. The mobile communications device in accordance with claim 1, wherein the processor is further configured to identify the person with the first level of accuracy via a first authentication mechanism and to authenticate the person with the higher second level of accuracy via a second authentication mechanism, wherein the first and second authentication mechanisms are distinct from one another.

7. The mobile communications device in accordance with claim 6, wherein the first authentication mechanism comprises audio authentication, the second authentication mechanism comprises facial recognition.

8. The mobile communications device in accordance with claim 7, further comprising a fingerprint sensor, and wherein the processor is further configured to detect that the distance between the mobile communications device and the person has become less than a second threshold distance and, in response, to authenticate the person via the fingerprint sensor.

9. The mobile communications device in accordance with claim 8, wherein the processor is further configured to grant the person access to the mobile communications device at a level that is based at least in part on the authentication mechanism applied.

10. The mobile communications device in accordance with claim 9, wherein the processor is further configured to identify one or more other persons near the device, and to grant the person access to the mobile communications device at a level based in part on the identities of the one or more other persons.

11. The mobile communications device in accordance with claim 1, wherein the processor is further configured to continue to allow user access without change if the mobile communications device is picked up.

12. The mobile communications device in accordance with claim 11, wherein the processor is further configured to determine that the mobile communications device has been put down after being picked up and that the user has then moved beyond arm's length from the device, and, in response, to revoke all access granted.

13. A method of authenticating a user of a mobile communications device via sensor bootstrapping to provide an adaptive interface comprising:
   activating a first sensor group having one or more first sensors;
   detecting a person via at least one of the one or more first sensors;
   in response to detecting the person, activating a second sensor group having one or more second sensors, wherein the one or more first sensors operate at a lower power level than the one or more second sensors;
   using at least one of the one or more second sensors to authenticate the person with a first level of accuracy and locate the person relative to the mobile communications device;
   detecting that a distance between the mobile communications device and the person has become less than a first threshold distance, and in response, authenticating the person with a second level of accuracy, wherein the second level of accuracy is greater than the first level of accuracy.

14. The method in accordance with claim 13, wherein activating the first sensor group comprises activating one or more of a barometric sensor, an audio sensor, a thermal sensor, a light switching sensor, a light change sensor and an RF (radio frequency) sensor.

15. The method in accordance with claim 13, wherein activating the second sensor group comprises activating at least one of a depth imager and camera.

16. The method in accordance with claim 13, wherein the processor is further configured to authenticate the person with the first level of accuracy via a first authentication mechanism and to authenticate the person with the second level of accuracy via a second authentication mechanism, wherein the first and second authentication mechanisms are distinct from one another.

17. The method in accordance with claim 16, wherein the first authentication mechanism comprises audio authentication, the second authentication mechanism comprises facial recognition.

18. The method in accordance with claim 17, further comprising a fingerprint sensor, and wherein the processor is further configured to detect that the distance between the mobile communications device and the person has become less than a second threshold distance and, in response, to authenticate the person via the fingerprint sensor.

19. A method of authenticating a user of a mobile communications device via sensor bootstrapping to provide an adaptive interface comprising:
   scanning an environment of the mobile device with a first sensor;
   detecting a person via the first sensor;
   in response to detecting the person, activating a second sensor, the second sensor having a higher operating a power than the first sensor;
   identifying the person as an authorized user of the mobile communications device via the second sensor using a first authentication mechanism, and granting a first level of access to the person; and
   detecting that the person has moved to within a first threshold distance of the mobile communications device, and in response, identifying the person as an authorized user of the mobile communications device using a second authentication mechanism, and granting a second level of access to the person, wherein the second authentication mechanism is more secure than the first authentication mechanism, and wherein the second level of access is more open than the first level of access.

* * * * *